United States Patent [19]

Zaruba et al.

[11] Patent Number: 4,514,175
[45] Date of Patent: Apr. 30, 1985

[54] CHILDREN'S STUFFED-ART CRAFT SET

[75] Inventors: John V. Zaruba, Chicago; Steven P. Hanson, Winnetka; Beth E. Luecke, Chicago; Wayne A. Kuna, Oak Park, all of Ill.

[73] Assignee: Marvin Glass & Associates, Chicago, Ill.

[21] Appl. No.: 572,302

[22] Filed: Jan. 20, 1984

[51] Int. Cl.³ .............................................. G09B 11/00
[52] U.S. Cl. ........................................ 434/82; 428/39; 428/542.2; 434/84
[58] Field of Search ....................... 434/81, 82, 83, 84, 434/93, 96; 38/102.2; 428/13, 16, 39, 542.2

[56] References Cited

U.S. PATENT DOCUMENTS

| | | | |
|---|---|---|---|
| 935,841 | 10/1909 | Fife | 38/102.2 |
| 3,236,368 | 2/1966 | Eisen | 434/81 X |
| 3,484,316 | 12/1969 | Dirrim | 428/16 X |
| 3,553,062 | 1/1971 | Berlin | 434/81 X |
| 4,160,685 | 7/1979 | Kuroda | 428/79 |

OTHER PUBLICATIONS

Know How by Usborne, Comics Section Washington Post, Oct. 5, 1975.

*Primary Examiner*—Harland S. Skogquist
*Attorney, Agent, or Firm*—John S. Pacocha

[57] ABSTRACT

A children's stuffed-art craft set includes a background board having two-dimensional graphics on a face surface with openings of various shapes forming elements of the graphics extending through the board to the opposite surface. Backing pieces, and relatively soft, stuffing pieces which are readily compressible compared to the background board and backing pieces, are shaped to fit into background board openings. Pieces of fabric or other material, larger than the openings and of various colors, patterns and textures are also supplied. A selected fabric piece is placed over the conforming stuffing and backing pieces and then inserted through the opening in the backing board from the opposite surface. The thickness of the extra fabric is wedged between the opening and the conforming backing piece to stretch the fabric, compress the stuffing and secure the combination in place creating a soft relief element of the picture or design following the two-dimensional graphics on the face of the background board.

15 Claims, 3 Drawing Figures

CHILDREN'S STUFFED-ART CRAFT SET

BACKGROUND OF THE INVENTION

1. Field of the Invention

This invention relates generally to a children's craft toy and, more particularly, to a craft set for creating stuffed-art designs.

2. Background Art

There is a wide variety of craft or activity sets available to children for creating artistic displays and decorative designs. Most of such children's sets facilitate the creation by children of a perhaps artistically simplified but nevertheless aesthetically satisfying display or design. Thus, for example, paint-by-number kits have provided children with many hours of enjoyment. One form of artistic or creative expression involves the making of various designs and decorations by stitching and stuffing. In such stuffed-stitchery different colored, patterned or textured fabrics are used to create elements of an overall design and a relatively soft, compressible substance is inserted between the outer fabric of the design elements and a backing to produce a soft sculptured effect. Children could be provided with sets of precut pieces of fabric, stuffing, a backing sheet with a preprinted design, thread and a needle, in the manner of the paint-by-number kits. However, some children, particularly younger children, may not have the necessary dexterity or coordination to complete the stuffed-art even with the aid of a preprinted pattern and precut fabric pieces in a kit. In addition, the pointed needles may cause some injury. Furthermore, while the permanence of the results obtainable with such kits may be desirable if a particularly pleasing result is obtained, it leaves little margin for error and does not encourage additional attempts to produce a better or more pleasing result without having to obtain a new kit. Accordingly, there remains a need for a children's stuffed-art craft set that permits children to, relatively easily and safely, create artwork having a soft, sculptured, three-dimensional effect while permitting the child to freely exercise choices of color, pattern and texture. Moreover, there remains a need for such a craft set that affords the child the opportunity to change the results and create new and different finished designs without requiring the purchase of a complete new set or kit.

SUMMARY OF THE INVENTION

The present invention is concerned with providing a children's stuffed-art craft set with which a child can safely and readily create soft sculptured pictures or designs using fabrics of a variety of colors, patterns and textures, and which can be reused to create new and different results. These and other objects and advantages of the invention are achieved by a craft set including a relatively flat backing board having two-dimensional graphics on a face surface with a number of openings extending through the board to the opposite side. The openings are of various shapes that conform to elements of the graphic design. Backing pieces that conform in shape to the openings extending through the background board but are slightly smaller than the openings fit loosely into the openings. Stuffing pieces made of a relatively soft substance that is readily compressible as compared to the background board and the backing pieces also conform in shape to a respective opening and backing piece. Fabric pieces of various colors, patterns and textures that are larger than the openings are also included. A fabric piece is selected and placed over the stuffing and the backing piece and the combination is then pushed through the opening in the background board from the opposite side. The excess fabric is wedged between the opening and the backing piece around the entire periphery to stretch the fabric, compress the stuffing and secure the backing piece, stuffing and fabric in place creating a soft relief element in the overall picture or design following the graphics on the face of the backing board.

BRIEF DESCRIPTION OF THE DRAWING

For a better understanding of the present invention reference may be had to the accompanying drawings in which.

DETAILED DESCRIPTION OF THE PREFERRED EMBODIMENT

Figure 1:
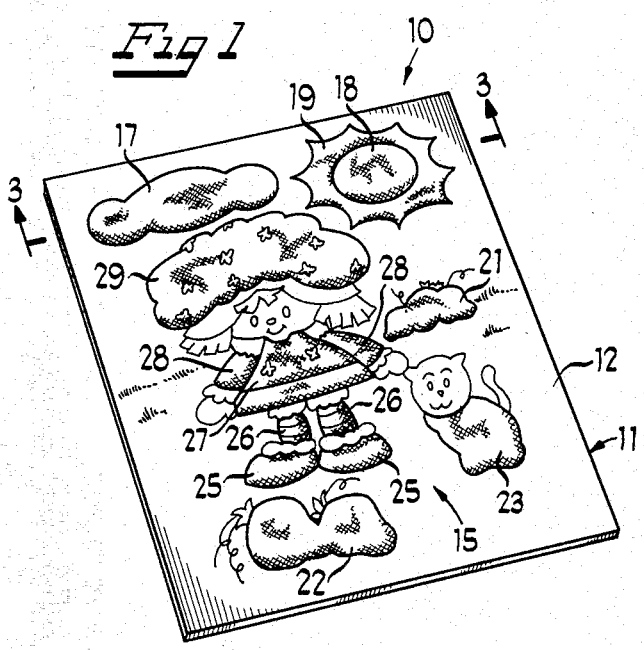
FIG. 1 is a perspective view of an embodiment of the present invention.

Referring now to the drawing in which like parts are designated by like reference numerals throughout the several views, there is shown in FIG. 1 a children's stuffed-art craft set 10 which includes a generally rectangular backing board 11 having a face surface 12 and an underside 13. On the face surface 12 there is a preprinted, two-dimensional, graphic design 15.

Some of the elements of the preprinted design 15 are cut out to create openings that extend all the way through the backing board 11. Thus, in the design illustrated in FIG. 1 the cloud 17, the sun 18 as well as its rays 19, the berry plants 21 and 22, the body 23 of the dog, the girl's shoes 25, stockings 26, skirt 27, sleeves 28 and hat 29 may all be cutout openings.

Figure 2:
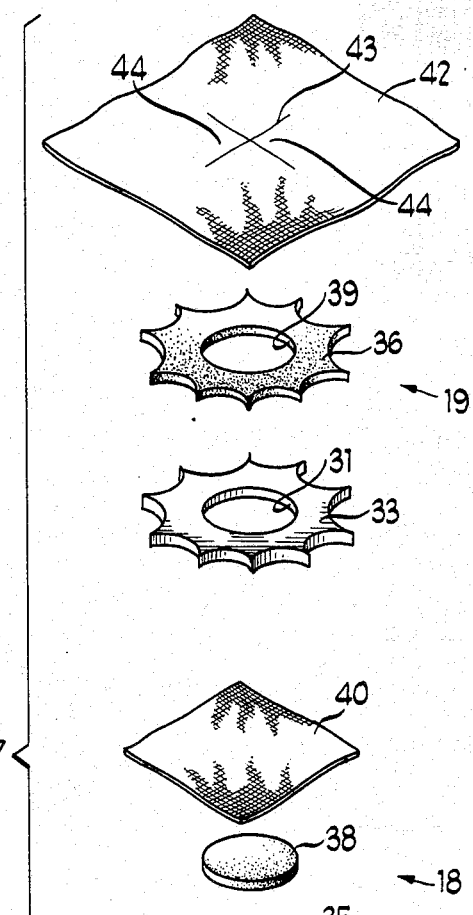
FIG. 2 is an enlarged scale, exploded perspective view of some of the components of the present invention.
Figure 3:
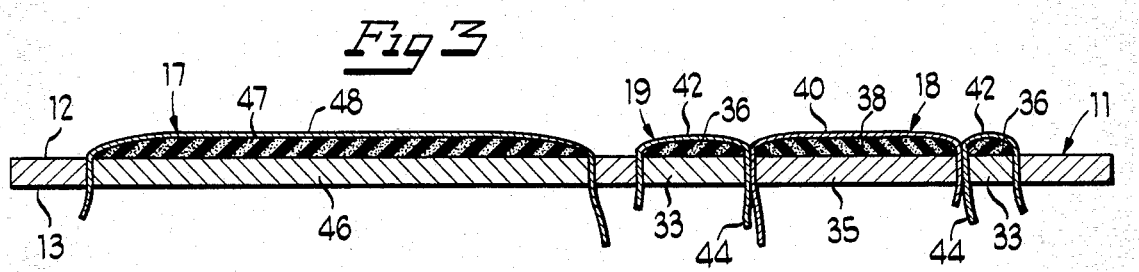
FIG. 3 is an enlarged scale, sectional view taken generally along line 3—3 of FIG. 1.

Components forming the sun 18 and the rays 19 are shown in exploded perspective in FIG. 2 and in section in FIG. 3 along with the components of the cloud 17. Each of the cutout openings has a backing piece that conforms in shape to the opening but is slightly smaller. Additional variations enhancing the completed stuffed-art are accomplished by providing openings extending through some of the backing pieces as well as the background board. Thus, the generally circular opening 31 for the sun 18 is formed in the backing piece 33 for the rays 19. A circular backing piece 35 is provided for the sun. Stuffing pieces 36 for the rays and 38 for the sun are formed of a relatively soft substance that is readily compressible as compared to the backing pieces and the background board. The stuffing pieces are positioned on top of the respective backing pieces. Like the backing piece 33, the stuffing piece 36 is provided with a generally centrally disposed circular opening 39.

Conveniently, the background board is about three-sixteenths to a quarter of an inch thick, but may be thinner or thicker and is formed of a relatively dense cardboard, fiberboard or plastic substance. When the openings are formed in the background board by die-cutting or a similar process, the cut-outs may be used as the backing pieces. As measured across a straight line spanning the opening in the backing piece, the backing piece is approximately a sixteenth of an inch smaller so that when the backing piece is centered in the opening the peripheral gap between the opening and the backing piece at any one point is approximately a thirty-second of an inch. A thirty-second of an inch gap size has been found to work with a sufficiently wide range of fabrics.

A supply of fabric pieces, each conveniently large enough to cover any of the openings in the background board with some excess remaining is included in the playset. Fabrics of various colors, patterns and textures such as gingham, percale, velour, calico, burlap, corduroy, felt, or any other material providing the desired surface appearance and having at least a limited amount of elasticity or resiliency may be used. A piece of fabric 40 for the sun 18 and a piece of fabric 42, preferably of a different color, pattern or texture, for the rays 19 is selected from the supply of fabric pieces. Generally, the fabric pieces may be reused and interchanged for different elements of the design. One exception to such reuseability of the material does occur in putting one design element into another such as the sun 18 into the rays 19. For such compound elements, it is necessary to provide an opening in about the center of the fabric covering for the outer element. Thus, the fabric piece 42 has an "X" shaped cut 43 approximatley in the center of the piece.

In assembling a design element, the fabric piece is generally placed over the stuffing piece which is placed atop the backing piece and the combination is pushed into the opening of the backing board through the underside 13. In some instances it may be helpful to initially glue or otherwise adhere the stuffing to the backing and then place the fabric over the combination to prevent shifting of the stuffing piece relative to the backing piece. As the combination is inserted, the fabric is stretched over the stuffing piece compressing the stuffing piece at least around the edges and wedging the remainder of the fabric into the gap between the backing piece and the board, to secure the combination in the backing board. The cloud 17 is thus created using a backing piece 46, stuffing 47, and a selected fabric piece 48.

When putting together a compound element such as the sun 18 and rays 19, the fabric 42 for the outer rays is initially put over the stuffing piece 36 which is then put on top of the backing piece 33 and the assembly is inserted into the backing board 11 from the underside 13. Then the fabric piece 40 for the sun 18 is placed over the stuffing disc 38 and then atop the backing disc 35. The flaps created by the "X" slit 43 are pulled back through the opening 31 from the underside to provide an opening in the fabric 42. To facilitate insertion of the assembly for the sun 18 through the openings 31 and 39 in the backing piece 33 and stuffing 36, respectively, the flaps 44 may be temporarily secured to the underside 13 of the background board by tape or pins. If the piece 42 becomes wrinkled during insertion of the combination for the sun 18, pulling on the flaps 44 from the underside of the background board will stretch the fabric for the rays 19.

While a particular embodiment of the invention has been shown and described, it will be apparent to those skilled in the art that further changes and modifications may be made without departing from the invention. It is intended in the appended claims to cover all such changes and modifications as fall within the true spirit and scope of the invention.

What is claimed as new and desired to be secured by Letters Patent is:

1. A children's craft set comprising:
    a backing board having a face surface and an opposite surface;
    two-dimensional graphics defining a plurality of elements on the face surface;
    a first opening conforming in shape to at least one of the elements extending through the background board;
    a first backing piece conforming in shape to the first opening and fitting into the first opening leaving a first peripheral gap; and
    a first piece of resilient material large enough to cover the opening with some extra material remaining to wedge into the first peripheral gap between the first backing piece and the first opening when the first piece of material and the first backing piece are pushed into the first opening from the opposite side to secure the first backing piece in the first opening.

2. The children's craft set of claim 1 in which there are a plurality of openings and conforming backing pieces and a plurality of pieces of material are provided.

3. The children's craft set of claim 1 in which:
    the first backing piece has a second opening extending through the first backing piece;
    a second backing piece conforming in shape of the second opening and fitting into the second opening leaving a second peripheral gap is provided;
    a second piece of material is provided;
    the first piece of material has means forming a third opening in approximately the center of the first piece of material; and
    the second piece of material and second backing piece are inserted through the third and second openings wedging excess portions of both the first and second pieces of material into the second peripheral gap to secure the second backing piece in the second opening.

4. The children's craft set of claim 3 in which the means forming the third opening is a slit.

5. The children's craft set of claim 1 including a first stuffing piece comforming in shape to the first backing piece and positionable between the first piece of material and the first backing piece.

6. The children's craft set of claim 5 in which the background board and the first backing piece are made of a relatively dense substance and the first stuffing piece is made of a relatively soft, readily compressible substance.

7. The children's craft set of claim 6 in which at least the edges of the first stuffing piece are compressed when the first piece of material, the first stuffing piece, and the first backing piece are pushed into the first opening.

8. The children's craft set of claim 7 in which the first backing piece is formed of the same substance as the background board.

9. The children's craft set of claim 8 in which the first backing piece is formed from the background board by the same process used to form the first opening in the background board.

10. The children's craft set of claim 4 in which:
    the first backing piece has a second opening extending through the first backing piece;
    a second backing piece conforming in shape to the second opening and fitting into the second opening leaving a second peripheral gap is provided;
    the first stuffing piece has a third opening extending through the first stuffing piece;

a second stuffing piece conforming in shape to the third opening and fitting into the third opening leaving a third peripheral gap is provided;

a second piece of material is provided;

the first piece of material has means forming a fourth opening in approximately the center of the first piece of material; and the second piece of material, second stuffing piece, and second backing piece are inserted through the second, third and fourth openings wedging excess portions of both the first and second pieces of material to secure the second backing piece in the second opening.

11. The children's craft set of claim 10 in which the means forming the fourth opening is a slit.

12. A method of creating a soft relief design comprising the steps of:

forming openings extending through a background board;

supplying pieces of resilient material large enough to cover the openings with some extra material remaining;

providing backing pieces conforming in shape to the openings that fit into the openings leaving a peripheral gap;

selecting a piece of material;

placing the piece of material over a backing piece; and inserting the backing piece and material into a conforming opening to wedge the extra remaining material into the opening to stretch the material over the backing piece and secure the backing piece in the opening.

13. The method of claim 12 including the step of inserting a stuffing between the material and the backing piece.

14. The method of claim 12 including the steps of:

providing two-dimensional graphics on a face surface of the background board defining a plurality of elements; and forming the openings extending through the background board conforming in shape to some of the elements.

15. The method of claim 12 including the single step of making the backing pieces by the same process used to form the openings in the background board.

* * * * *